United States Patent
Bannur et al.

(10) Patent No.: US 8,359,574 B1
(45) Date of Patent: Jan. 22, 2013

(54) OFFLINE MODE IN IDE FOR SEAMLESS SERVICE-ORIENTED-ARCHITECTURE-BASED APPLICATION DEVELOPMENT

(75) Inventors: Sunil Bannur, Bangalore KA (IN); Mayank Kumar, Bangalore KA (IN)

(73) Assignee: Adobe Systems Incorporated, San Jose, CA (US)

( * ) Notice: Subject to any disclaimer, the term of this patent is extended or adjusted under 35 U.S.C. 154(b) by 1032 days.

(21) Appl. No.: 12/354,970

(22) Filed: Jan. 16, 2009

(51) Int. Cl.
G06F 9/44 (2006.01)

(52) U.S. Cl. ......... 717/120; 717/162; 717/100; 711/138

(58) Field of Classification Search .................. 711/139; 717/120
See application file for complete search history.

(56) References Cited

U.S. PATENT DOCUMENTS

| | | | |
|---|---|---|---|
| 6,578,146 B2 * | 6/2003 | Johnson | 713/189 |
| 7,130,924 B2 * | 10/2006 | Bartlett et al. | 709/245 |
| 7,779,387 B2 * | 8/2010 | Harry et al. | 717/113 |
| 7,908,584 B2 * | 3/2011 | Singh et al. | 717/106 |
| 2003/0115145 A1 * | 6/2003 | Lee et al. | 705/54 |
| 2004/0098703 A1 * | 5/2004 | Kondur | 717/100 |
| 2005/0091185 A1 * | 4/2005 | Koutyrine et al. | 707/1 |
| 2006/0080639 A1 * | 4/2006 | Bustelo et al. | 717/111 |
| 2007/0026855 A1 * | 2/2007 | Enenkiel | 455/425 |
| 2007/0078950 A1 * | 4/2007 | Hopkins et al. | 709/217 |
| 2007/0088805 A1 * | 4/2007 | Cyster | 709/217 |
| 2007/0174826 A1 * | 7/2007 | Guarraci | 717/140 |
| 2008/0215726 A1 * | 9/2008 | Sullivan | 709/224 |
| 2008/0270980 A1 * | 10/2008 | Ahadian et al. | 717/109 |
| 2009/0013310 A1 * | 1/2009 | Arner et al. | 717/120 |
| 2009/0193394 A1 * | 7/2009 | Dasch et al. | 717/120 |
| 2010/0153521 A1 * | 6/2010 | Lor et al. | 709/219 |

OTHER PUBLICATIONS

Python Development in Netbeans, Zetcode (Nov. 30, 2008), retrieved from http://zetcode.com/articles/netbeanspythondevelopment/ on Apr. 19, 2012.*
Wikipedia Article, "Eclipse (software)," available at http://http//.en.wikipedia.org/wikie?Eclipse_(software), page last modified Feb. 2, 2010 (last accessed Feb. 3, 2010).

* cited by examiner

*Primary Examiner* — Don Wong
*Assistant Examiner* — Theodore Hebert
(74) *Attorney, Agent, or Firm* — Kilpatrick Townsend & Stockton LLP

(57) ABSTRACT

A development application can provide an integrated development environment that interfaces with one or more data sources that will be used by the application under development. Sample data from the source(s) can be used to aid the coding process and/or testing the application under development. The development application can maintain a cache to support offline access of data from the source(s) to allow development to continue when a source cannot be accessed and/or when a developer wishes not to access a particular source. Code elements can be included in the application under development to cause the application under development to access the cached data based on settings in the development application. The added code elements can automatically be removed when the application is released.

20 Claims, 11 Drawing Sheets

FIG. 12

OFFLINE MODE IN IDE FOR SEAMLESS SERVICE-ORIENTED-ARCHITECTURE-BASED APPLICATION DEVELOPMENT

TECHNICAL FIELD

The disclosure below generally relates to software development, particularly to development applications for authoring/editing software applications.

BACKGROUND

A developer who desires to build an application generally will rely on one or more application development tools to generate source code or other code for the application. Although code can be entered manually in text form, much conventional application development makes use of more sophisticated authoring tools, packages or suites that, in addition to allowing text entry, provide options to aid the code authoring process.

For example, a development application may provide an integrated development environment (IDE) including a graphical user interface whereby a developer can select common or predefined code elements representing objects, classes, procedures, scripts, and the like or templates or frameworks for entering the same. An IDE may also include support for other features such as compiling and debugging applications developed using the IDE and managing libraries of code and other application components.

For example, ADOBE® FLEX BUILDER™ is an increasingly popular development environment that makes use of the ACTIONSCRIPT™ programming language to define mxml files that are complied for execution by ADOBE® FLASH® or AIR™ (all available from Adobe Systems Inc. of San Jose, Calif.). These and other development environments may allow for an application to be developed that handles user input and output based on a plurality of defined states while relying on data resources operating independently from the application as the ultimate source (and/or destination) of data used by the application under development. Use of these frameworks can present coding and other development challenges.

The challenges may be particularly apparent when developing in a Service Oriented Architecture (SOA) in which some (or all) functionality of an application depends on data from a remote source, such as a web service. For instance, to meaningfully debug or otherwise test the application under development, the developer may need access to the web service. This may be impossible, such as when a connection to the service is unavailable due to the developer's location, or inadvisable, such as when a connection to the service incurs charges.

SUMMARY

In some embodiments, a development application can provide an integrated development environment that interfaces with one or more data sources that will be used by the application under development. Sample data from the source(s) can be used to aid the coding process and/or testing the application under development. The development application can maintain a cache to support offline access of data from the source(s) to allow development to continue when a source cannot be accessed and/or when a developer wishes not to access a particular source. Code elements can be included in the application under development to cause the application under development to access the cached data based on settings in the development application. The added code elements can be removed automatically when the application is released.

Embodiments include a computer platform comprising a code manager, a data sampler, and a data cache manager. The code manager can receive input specifying elements for an application under development and store code in a computer-readable medium, the code providing the specified elements when executed at runtime. The data sampler can query a data source to be accessed by the application under development at runtime and receive a data sample in response to the query.

In some embodiments, the data sample may be used by a data introspection module to "characterize" the returned data sample, where "characterizing" comprises determining a logical component for use in the code to refer to a data parameter sent between the application under development and the data source at runtime. As another example, the data sample may be used to debug, test, or otherwise used when the application under development is executed.

The data cache manager can facilitate offline access to data from the data source. For example, the data cache manager may maintain a cache comprising parameters sent to a data source and corresponding data returned from the source. When offline access is desired, the data cache manager can seamlessly link the cached data to the application under development, e.g., for testing purposes. The development application may access the data sample from the data cache in order to characterize the data, such as by associating strongly-typed references with the data parameters in the code of the application under development.

Since the offline capability is part of the IDE in some embodiments, references to the data source in the application under development do not need to be changed between the actual source URL (or other locator) and a URL or indicator of the cached data when switching between online and offline modes. Instead, the source URL (or other indicator) remains the same, but additional code elements cause the application to treat the source URL as a reference to the cached data.

These illustrative embodiments are mentioned not to limit or define the limits of the present subject matter, but to provide examples to aid understanding thereof. Illustrative embodiments are discussed in the Detailed Description, and further description is provided there. Advantages offered by various embodiments may be further understood by examining this specification and/or by practicing one or more embodiments of the claimed subject matter.

BRIEF DESCRIPTION OF THE DRAWINGS

A full and enabling disclosure is set forth more particularly in the remainder of the specification. The specification makes reference to the following appended figures.

FIGS. 7, 8, 9, 10, 11, and 12 illustrate exemplary interfaces that may be used by a developer while developing an application.

DETAILED DESCRIPTION

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment. Thus, it is intended that this disclosure includes modifications and variations as come within the scope of the appended claims and their equivalents.

In the following detailed description, numerous specific details are set forth to provide a thorough understanding of the claimed subject matter. However, it will be understood by those skilled in the art that claimed subject matter may be practiced without these specific details. In other instances, methods, apparatuses or systems that would be known by one of ordinary skill have not been described in detail so as not to obscure the claimed subject matter.

Some portions of the detailed description which follow are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the following discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

Figure 1:
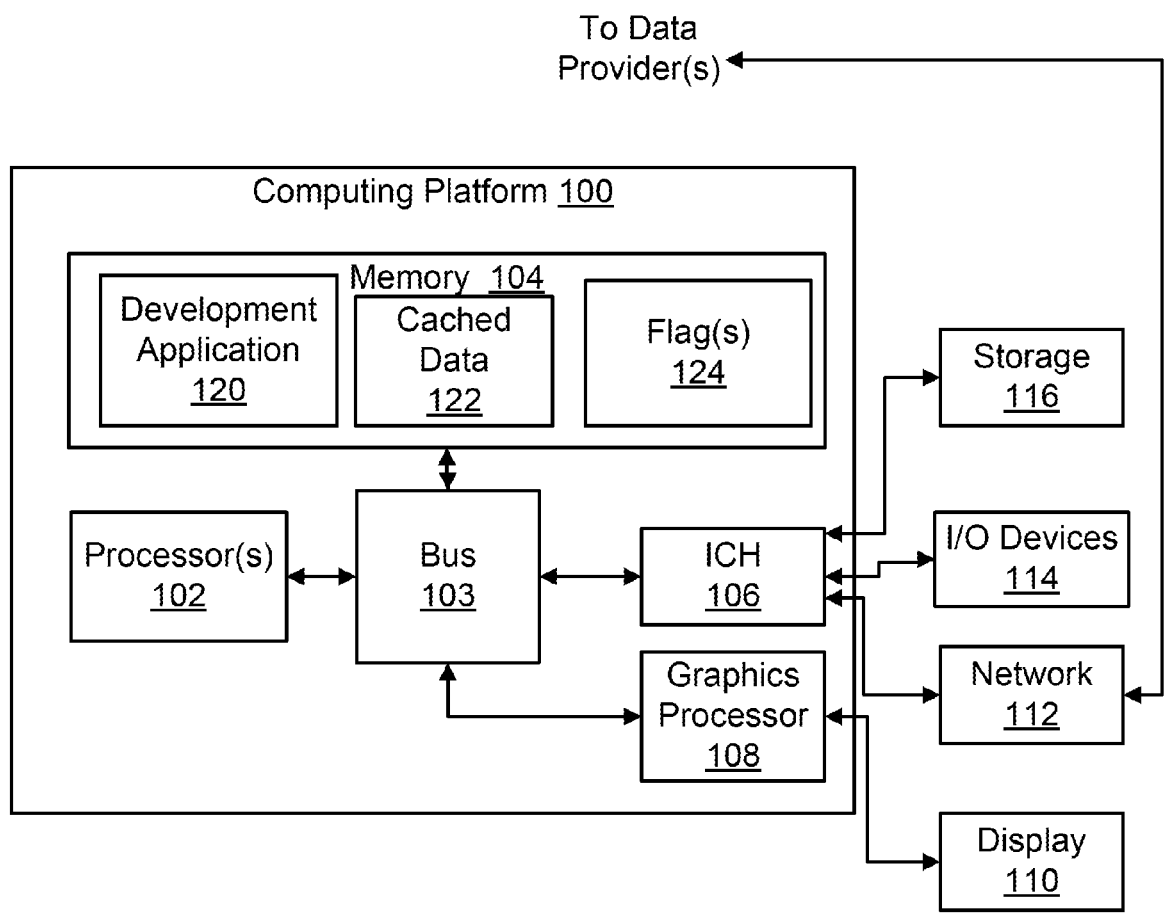
FIG. 1 is a block diagram illustrating an exemplary computing platform configured to provide an embodiment of a development application.

FIG. 1 illustrates an example of computing platform 100 suitable for implementing embodiments of the methods and systems as described in the examples herein. The exemplary computing platform of FIG. 1 comprises: one or more processors 102; memory 104, representing one or more computer-readable media accessible by processor(s) 102 (e.g., processor cache, volatile memory such as DDR RAM, EDO RAM, etc, nonvolatile memory such as flash memory, etc.); an I/O control hub (ICH) 106; a graphics processor 108; and a bus 103. Graphics processor 108 is shown as connected to a display 110 of which different types exist such as Cathode Ray Tube (CRT), Thin Film Transistor (TFT), Liquid Crystal Display (LCD), DPL, etc. ICH 106 facilitates connection to various devices including a network interface component 112 (e.g., for connection to a local area network, wide area network, etc.); user I/O devices 114 (e.g., keyboard, touchpad, mouse, etc.); and storage 116 (e.g. additional computer-readable media such as a local or remote disk).

The one or more processors 102 execute instructions in order to perform whatever software routines the computing system implements. The instructions frequently involve some sort of operation performed upon data. Memory 104 is deliberately made available to other components within the computing platform. For example, the data received from various interfaces to the computing system (e.g., keyboard and mouse, printer port, LAN port, modem port, etc.) or retrieved from an internal storage element of the computing system (e.g., hard disk drive) are often temporarily queued into memory 104 prior to their being operated upon by the one or more processor(s) 102 in the implementation of a software program. Similarly, data that a software program determines should be sent from the computing system to an outside entity through one of the computing system interfaces, or stored into an internal storage element, is often temporarily queued in memory 104 prior to its being transmitted or stored.

The ICH 106 is responsible for ensuring that such data is properly passed between the memory 104 and its appropriate corresponding computing system interface (and internal storage device if the computing system is so designed). Bus 103 serves to connect memory 104, processor(s) 102, ICH 106, graphics processor 108, and/or additional components of computing platform 100.

FIG. 1 further illustrates an embodiment of a development application 120 that may be loaded into or resident in memory 104. As will be discussed in further detail below, an embodiment of a development application 120 can rely on cached data 122 to provide enhanced functionality for an application developer. Specifically, development application 120 can consult one or more flags 124 or other suitable indicators in memory to determine when a data source is available for use by development application 120 in testing an application under development and/or in characterizing data provided by the data source to provide code hinting and/or manage data typing. For example, a data source may or may not be reachable via network connection 112 and/or or other data links available to platform 100 and/or a user may not desire to access a remote source. In such cases, cached data 122 can be used.

Memory 104 may include additional components such as an operating system to coordinate operation of the computing platform and working files for development application 120, and so it should be understood that this example is not meant to limit the present subject matter.

As will be noted below, in some embodiments, memory 104 may include code for an application under development. The code may comprise source code and/or executable code and can include elements so that, depending on the status of flag(s) 124, the application under development consults cached data 122 rather than accessing one or more data sources. For instance, flag(s) 124 may be set by development application 120 to indicate which services are to be accessed "online" or "offline."

Figure 2A:
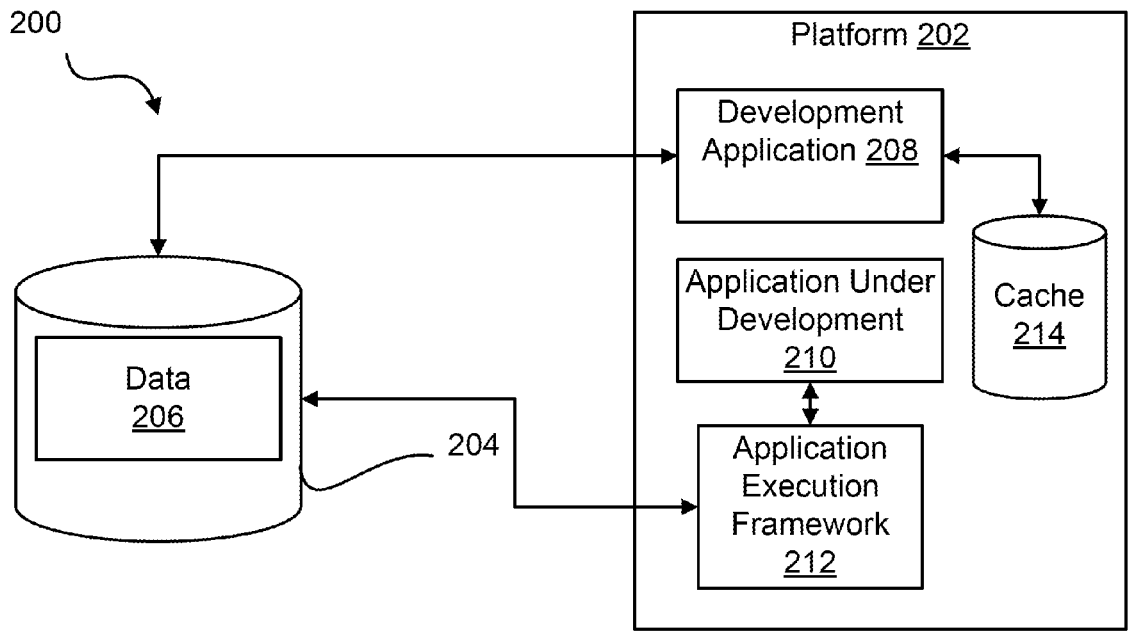
FIGS. 2A and 2B are each a block diagram illustrating an embodiment of a system configured to support data caching.
Figure 2B:
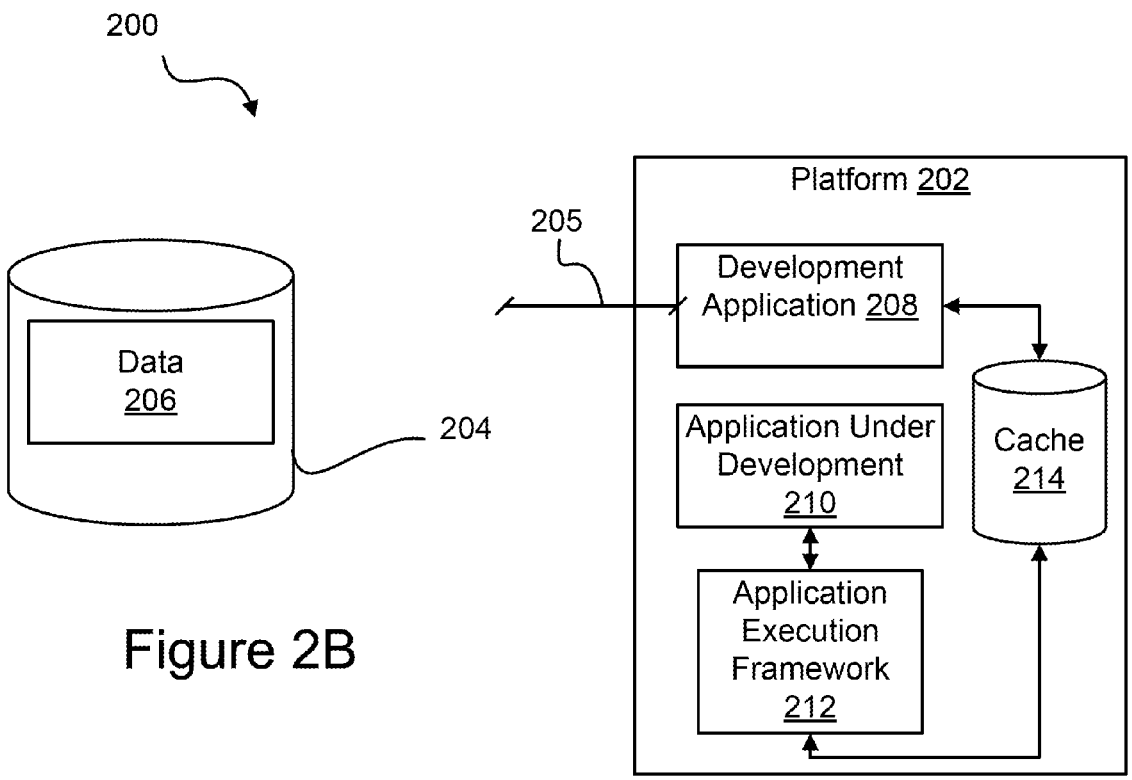

FIGS. 2A and 2B are each a block diagram illustrating an embodiment of a system 200 including a computing platform configured to support data caching. Both FIGS. 2A and 2B depict a computing platform 202 and a data source 204 that provides data 206. For example, data source 204 may correspond to a web service or other data provider that is the intended source of data for an application under development 210. In this example, computing platform 202 includes a development application 208 which is used to define, view, and/or edit code for application under development 210 and to support caching of data from source 204.

Development application 208 may be used, for instance, to work with source code and subsequently compile or interpret the code at execution time. Development application 208 may comprise, for example, an integrated development environment (IDE) that includes code authoring components, debugging components, and other tools to facilitate the development process.

In this example, application under development 210 can be executed (or interpreted, as the case may be) via application execution framework 212. As an example, development application 208 may be used to define MXML code using the ACTIONSCRIPT™ language for compiling into SWF, AIR, or other files suitable for execution using ADOBE® FLASH® or AIR™, all available from Adobe Systems Inc. of San Jose Calif. However, the subject matter taught herein can be used in the context of other languages and/or execution environments.

In FIG. 2A, development application 208 accesses data source 204 as indicated by arrow 201. This may be based on one or more elements of application under development 210 that reference an interaction with data source 204 by application under development 210 at runtime. For example, application under development 210 may include code elements that refer to a query to data source 204 and one or more objects (or other logical indicators) representative of data returned from data source 204 in response to the query(s). Other interactions can include write requests or deletion requests made by the application under development.

In accordance with some aspects of the present subject matter, development application 208 maintains a cache 214 comprising result data returned from source 204. For instance, in some embodiments, development application 208 recognizes a code element, or input specifying a code element, that references an interaction to be made with source 204 by application under development 210. Development application 208 can provide user interface(s) such as dialogs or wizards for defining and managing one or more code elements to be used by application under development 210 to refer to returned data. Managing the elements used to refer to one or more portions of the returned data is referred to herein as "characterizing" data from source 204 and more detailed examples are provided later below.

When data is returned by data source 204 in response to one or more queries by development application 210, a copy of the data can be stored in cache 214. For example, development application 208 may maintain cache 214 by storing a table correlating queries to one or more data sources and result data received from the respective data sources in a computer-readable medium. The data for the queries may indicate one or more query parameters, such as arguments and commands. The data may also include data identifying the respective data sources by URL or other suitable indicators.

Development application 208 can be configured to include code corresponding to one or more cache reference elements in application under development 210 so that, at runtime, application under development 210 accesses cached data rather than accessing data source 204. For example, a connection to data source 204 may not be available and/or a developer may wish to avoid accessing data source 204 even if a connection is available. This is represented in FIG. 2B by the broken connection line 205.

The cache reference element(s) can link the reference to the data source by the application under development to data from cache 214 without the need for the developer to change the actual reference(s) in the code of the application under development. The particular syntax will vary according to the code language(s) in which application 210 is developed. Essentially, the cache reference element(s) are code elements that cause application 210 to consult one or more availability flags that can be set using development application 208 and, provided the flag(s) indicate cached data is to be used, cause application 210 to access cached data rather than source 204.

In some embodiments, application 210 accesses data from cache 214 directly, such as by providing a call to a service maintained by a cache manager of development application 208. However, in some embodiments, application 210 does not access cache 214 directly. Instead, appropriate data from cache 214 can be included in or alongside the data comprising an executable version of application 210.

In some embodiments, development application 208 can evaluate code for application under development 210 to determine if cache 214 includes data corresponding to all data sources referenced in the code. For example, if one or more referenced sources lacks corresponding data in cache 214, development application 208 can provide suitable indications and/or options to a user if the user indicates that "offline" operation is desired. For instance, the user may be provided an alert along with an option to obtain sample data from the sources for which there is no data in cache 214 and/or an interface may be provided for the user to define sample data and queries for inclusion in cache 214.

As another example, development application 208 can utilize a network monitoring application to monitor traffic from the application under development. If the application under development is unable to find the required data for the required input, the development application can provide an interface, such as a popup window, for a user to provide input. As another example, the application under development may include code that provides the interface and communicates the data input for the development application 208 to update the cache.

Figure 3:
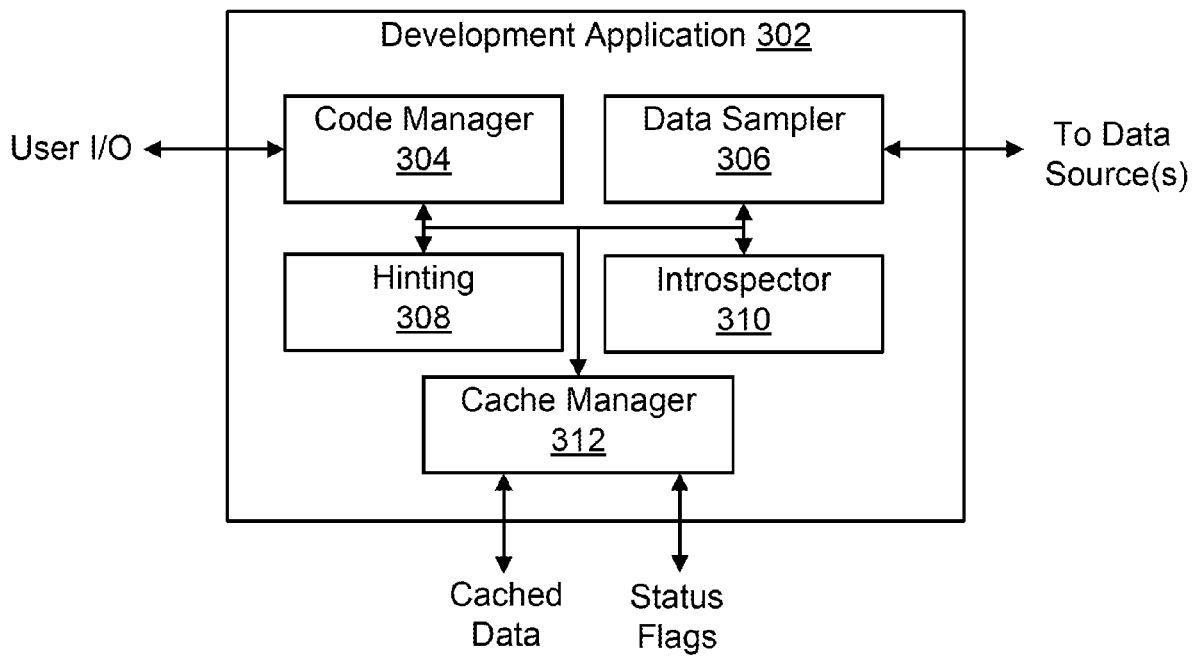
FIG. 3 is a block diagram illustrating components of an exemplary development application.

FIG. 3 is a block diagram showing components of an exemplary development application 302. For ease of explanation, not all possible components of development application 302 are illustrated—for instance, common elements of an application development tool such as a text editing engine, library management functions, compilers, debuggers, and the like are not shown but may be included. Although shown as a single application, development application 302 may be implemented as a suite of applications, processes, and/or components.

In this example, development application 302 includes a code manager 304 that may provide an interface to receive input specifying code elements of a computer application under development and to store code in a computer-readable medium. For instance, code manager 304 may provide a graphical user interface (GUI) including a text editor and/or drag-and-drop selection menus with corresponding code segments to allow a user to specify code elements and to provide output indicating the code elements and other aspects of an application under development. Code manager 304 may also provide suitable user interface (UI) elements for other aspects of development application 302 via as menus, dialog boxes, wizards, audio feedback and receive input comprising text, mouse gestures, or other input.

Development application 302 also includes data sampler 306, which may include program code for identifying a code element referencing interaction with a data source by the computer application when the computer application is executed at runtime. For example, code may be parsed by data sampler 306 to locate code segments that call or query data sources. Additionally or alternatively, data sampler 306 may identify a code element referencing interaction with a data source based on user input. For instance, a user may provide input to define or edit such a code element via code manager 304.

For example, code for an application under development may include a call to a data source, such as a call to query a web service. This code may be input by a user and recognized by data sampler 306. As another example, the user may select an option to define a new call to the web service.

Data sampler 306 can also include program code for interfacing with the data source, providing a query to the data source, and receiving result data from the data source in response to the query. For example, once the reference to the data source in the code for the application under development is recognized, the user may be presented with a dialog, wizard, or other interface to define one or more parameters for querying the data source so that development application 302 interacts with the data source in the same manner as application under development is intended to. For instance, development application 302 may use the same query type, URL, and may provide appropriate parameters to obtain data in the same manner as the application under development will obtain data. Data returned from the data source can be received by data sampler 306 and stored in working files of development application 302 for subsequent use and inclusion in the cache as noted below.

Development application 302 further includes a hinter 308 and data introspection module 310. For example, in some embodiments, data samples may be obtained for purposes of "characterizing" data obtained from a data source. As mentioned above, "characterizing" the returned data can include determining information about how data returned from one or more data sources is related to particular elements of the application under development. For example, an object (or other logical unit) corresponding to data returned by a particular data source may have a specific reference in the code for the application under development.

In some embodiments, data introspection module 310 can facilitate defining "strongly typed" objects or other components as part of the development process whereby a returned group of parameters is given custom declarations in the code that meaningfully describe the parameters in the context of the source data structure(s) from which the parameters will be received (and/or to which the parameters will be provided). Thus, the logical units used to refer to data from the data source can be structured or configured to reflect the parameter(s) represented by those logical units. However, embodiments of the present subject matter can use characterizations of the data to provide assistance to developers even if "strong types" are not used.

Hinter 308 can be configured to recognize user input at least partially or potentially referencing the use of data returned by a query made by the application under development to a data source at runtime. Hinter 308 can provide output based on the partial input and characterization(s) of the data returned by the query. For instance, a hint can suggest a type characteristic for use as part of the source code element referring to the query results, such as by offering options for completing an incomplete reference to an object or other logical unit corresponding to data returned by the query. If the user has provided custom type information for identifying the different parameters, the custom types may be used. Regardless of whether custom type information is associated with the parameters, the information obtained by the data introspection module can be used to aid a developer in writing or generating code segments.

Further details of data introspection and hinting can be found in U.S. patent application Ser. No. 12/271,167, filed Nov. 14, 2008 and titled "Methods and Systems for Data Introspection," which is incorporated by reference herein in its entirety. Although some embodiments configured in accordance with the present teachings may leverage data caching when providing hinting and code typing functionality, it will be understood that some embodiments may provide data caching without hinting or code typing functionality.

Development application 302 further includes cache manager 312, which can comprise program code for maintaining a cache of result data obtained using data sampler 306. For example, the cache may be maintained by defining one or more databases (or other suitable data structures) correlating query parameters and results when a query for sample data is performed. Maintaining a cache of result data may also comprise simulating result data based on user-provided input. For example, a user may be presented with an interface to define query parameters and result data that is subsequently added to the cache. The user may also edit data in the cache via the interface. As noted above, such an interface may be presented by cache manager 312 in order to address situations in which data from a particular source is referenced in code for an application under development but is not in the cache.

For example, cache manager 312 may evaluate code for the application under development to identify references to interactions with data sources. For each referenced data source, the cache contents may be checked to determine if a corresponding entry for the data source is in the cache, such as by examining cache entries for matching URLs or other data source indicators. Even if result data obtained from particular source is included in the cache, cache manager 312 may nonetheless prompt a user for entry of data. For instance, a source may support multiple query types and cache manager 312 may check the cache against types of queries referenced in the code for the application under development to determine if a representative sample is included each query type.

In addition to or instead of prompting a user to input data for the cache, cache manager 312 may present the user with an option to provide the query to the data source in question. For example, when a user provides a command, such as a menu selection to switch a particular source to "offline" mode, the cache may be evaluated to determine if the cache contains result data corresponding to one or more queries for the source. If the cache does not include the result data, the user may be prompted to sample data from the source prior to switching to "offline" mode.

In some embodiments, cache manager 312 maintains some or all of the cache in encrypted form. For example, sampled data (and/or query parameters) may involve sensitive information restricted from disclosure by terms of service or other agreements and/or by law or regulation. Cache manager 312 can encrypt data by any suitable method, including but not limited to known algorithms such as Blowfish and DES. In some embodiments, a user generated certificate can be used, with user randomness (such as mouse, keyboard, or other input) providing a seed, with the certificated used as the key for encryption.

Code manager 304 can include program code for including a cache reference element in the application under development, the cache reference element linking the reference to the data source by the computer application to the cache of result data. For example, in some embodiments, cache manager 312 sets flags or other suitable data items to indicate when a data source is to be accessed "live" or when cached data is to be used. Flag status can be set through a user interface, such as a dialog box or panel where a user indicates which data sources are "online" (i.e., which sources are to be accessed "live") and which sources are to be considered unavailable (i.e., sources for which cached data can be used).

The cache reference element(s) can cause the application under development to access cached data based on the status flag(s). The flag(s) may also be used by development application 302 to determine whether live or cached data is to be used for data introspection or other purposes.

Code manager 304 can also access some or all data from cache manager 312 to include one or more data structures comprising cached data for the application under development to use. For example, cache manager 312 may organize cached data by reference to particular services. If code manager 304 recognizes code segments calling a particular service, then cached result data from the service can be requested from cache manager 312 and then packaged into a suitable structure (or structures) for inclusion as part of the application under development or use alongside the application under development. For example, as noted below, in some embodiments, the cached data is included as one or more XML files embedded in an executable application or package of files distributed for execution.

Figure 4:
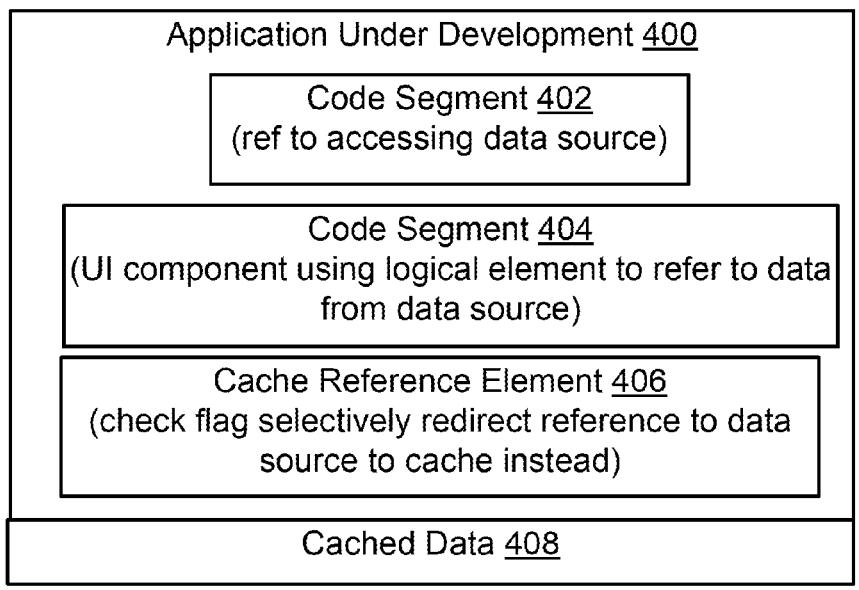
FIG. 4 is a block diagram illustrating exemplary code of an application under development.

FIG. 4 is a block diagram illustrating exemplary code of an application under development 400. In this example, application 400 includes code segment 402, which may reference interaction with a data source and code segment 404 which is code using a logical element referring to data obtained from the interaction referenced in code segment 402. As an example, code segment 402 may represent a call to business logic provided via a web service, while code segment 404 represents code defining a user interface element such as a table or text area that displays data obtained from the business logic. An example of code segments 402 and 404 are presented below in ACTIONSCRIPT code:

| Reference (402) to data source | Reference (404) to UI or other application element |
|---|---|
| <mx:WebService id="weatherService" wsdl="http://weatherservice.example?temperature"> <mx:operation name="GetWeather"> | <mx:TextArea id="temp" text="The current temperature is {WeatherService.GetWeather.result.CurrentTemp}." height="30" width="200"/> |

For example, the application may treat returned data parameters as objects or other suitable logical units. In order for another element to reference the data at runtime, code for the element must correctly reference the object(s) corresponding to the data of interest. In this example, the operation "GetWeather" is defined as an operation that utilizes the service "weatherService" accessed via a query to http://weatherservice.example. Results from the interaction with the "weatherService" data source are referred to in the application using "WeatherService.GetWeather.result," with particular parameters referred to in this syntax via the "." (dot) followed by a suitable reference element—in this example, the "current temperature" parameter is referred to as "WeatherService.GetWeather.result.CurrentTemp."

Code segments 402 and 404 may be defined by one or more users of development application 302 and/or may be developed in any other suitable fashion and then accessed by development application 302. In accordance with aspects of the present subject matter, a development application 302 can operate on the data representing application 400 to include cache reference element 406.

Cache reference element 406 can, in effect, "redirect" one or more references to a data source so that an application under development instead refers to cached data at runtime. However, rather than representing a change in the underlying reference to a data source, cache reference element 406 represents a "pluggable" element that can be removed from application under development 400 when the application is to be released in a final version.

Using the "GetWeather" example above, conceivably a developer could manually change the code declaring "wsdl=http://weatherservice.example" to refer to a local proxy holding cached data, such as "wsdl=http://localhost." However, such an operation could become tedious to the developer inasmuch as the developer would need to change each reference to a service and also change each reference back to the "correct" source when use of the cache is no longer desired. Additionally, the developer would be required to support the cache, including configuring the cache to properly store data in a manner accessible when desired.

Instead, some embodiments of a development application configured in accordance with aspects of the present subject matter free the developer from the tedium of changing code references and provide integrated caching support as part of an integrated development environment. Using the "GetWeather" example above, a code manager or other suitable component of a development application can insert a service proxy class into the code for the application under development, the service proxy class redirecting the "GetWeather" method to the cache based on the availability status flag.

For example, in ACTIONSCRIPT, the service proxy class can comprise:

Cache Reference Element (406)

```
/**
 * This is a generated class and is not intended for modification.
 * To customize behavior of this service wrapper you may
   modify the generated sub-class of this class - HttpTest.as.
 */
package services.httptest
{
import mx.rpc.AsyncToken;
import fr.core.model_internal;
import mx.rpc.AbstractOperation;
import fr.services.wrapper.HTTPServiceWrapper;
import mx.rpc.http.HTTPMultiService;
import mx.rpc.http.Operation;
[ExcludeClass]
internal class _Super_HttpTest extends HTTPServiceWrapper
{
    var offline:boolean = false;
    var _cacheManager:CacheManager;
    // Constructor
    public function _Super_HttpTest( )
    {
        // initialize service control
        _serviceControl = new HTTPMultiService( );
        var operations:Array = new Array( );
        var operation:Operation;
        var argsArray:Array;
        operation = new Operation(null, "getTemperature");
        operation.url ="http://weatherservice.example";
        operation.method = "GET";
        operations.push(operation);
        _serviceControl.operationsList = operations;
        _cacheManager = CacheManager.getInstance(_serviceControl);
        model_internal::initialize( );
    }
```

-continued

Cache Reference Element (406)

```
public function getTemperature ( ) : AsyncToken
{
  var _internal_operation:AbstractOperation;
  var _internal_token:AsyncToken;
  if(!offline)
  {
    _internal_operation = _serviceControl.getOperation("getTemperature");
    _internal_token = _internal_operation.send( );
  }
  else
  {
    _internal_operation = _cacheManager.getOperation("getTemperature");
    _internal_token = _internal_operation.send( );
  }
  return _internal_token;
}
}
}
```

FIG. 4 further illustrates cached result data 408 appended to application 400. Cached result data 408 can comprise data from the source(s) referenced by code segment 402 and/or may comprise data provided by a developer for use in testing, with cache reference element 406 redirecting code segment 402 to access result data 408 based on availability flags. Code manager 304 and/or cache manger 312 can extract cached data corresponding to data source(s) referenced by the application under development and include the extracted cache data in cached result data 408. For example, application 400 may be packaged as an executable file in the SWF (FLASH®) format and cached result data 408 can comprise one or more XML files included in the SWF file. Although in this example cached result data 408 is embedded in application 400, some embodiments may support providing the cached result data as a separate file (or files) with cache reference element(s) 406 providing suitable reference to the separate file(s). Alternatively, cached data 408 may be provided via a service of the development application referenced in cache reference element 406 mimicking the response of the data source referenced in code segment 402.

In some embodiments, the generated code can be used to simulate the response time for the service or services in question. For instance, when data is cached, the access/response times and/or data rates can be stored along with the data items. When the cached data is used, the stored response times or data rates can be accessed and used to throttle the simulated response.

The code manager, such as code manger 304 of FIG. 3, or other component(s) of the development application can also be configured to remove cache reference elements such as element 406 and cached result data 408 when the option to use cached data is no longer needed. For example, a developer may wish to provide a "release" version of the application under development and select a menu or other command to build a release version. Because a separate cache reference element is used, the element can be easily removed from the code prior to release—for example, the cache reference element may be removed from source code automatically prior to compiling or may be skipped during the compile process based on tags or other identifiers that allow the compiler to recognize not to use the cache reference element.

Figure 5:
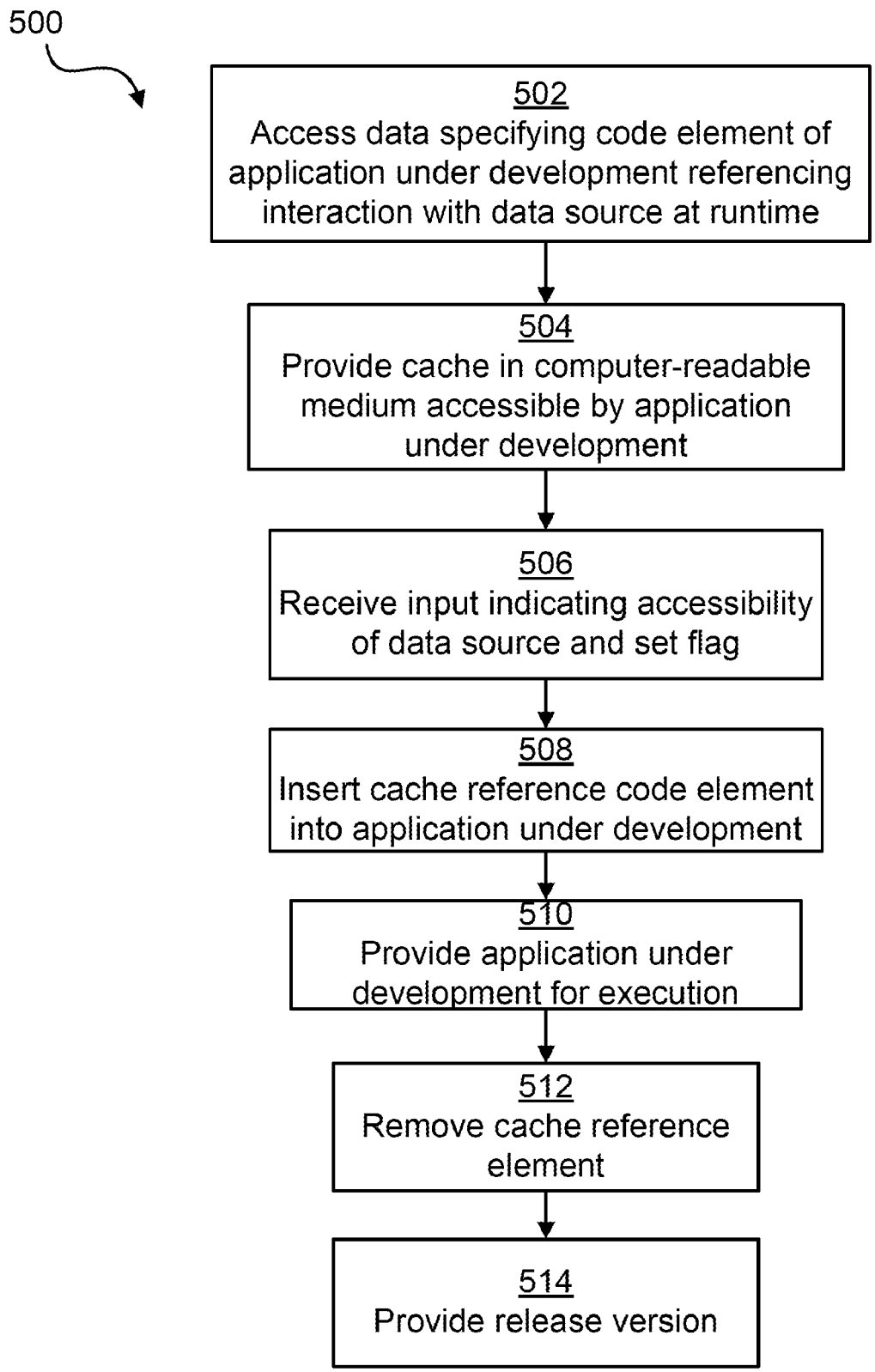
FIG. 5 is a flowchart showing an exemplary method for supporting offline access to cached data.

FIG. 5 is a flowchart showing an exemplary method 500 configured in accordance with aspects of the present subject matter. For example, method 500 may correspond to a computer-implemented method carried out by a computing platform that provides an IDE with data caching support.

Block 502 represents accessing data specifying a code element for an application under development, the code element referencing interaction with a data source by the application under development when the application under development is executed at runtime. For example, code for the application under development may be embodied in one or more data structures which are accessed and parsed. Based on code syntax, references to one or more data sources can be identified.

As another example of accessing data specifying a code element that references interaction with a data source, one or more commands may be received via user input such as typing, gestures (via a mouse or other pointing device), and/or menu selections. The command(s) may indicate that a code element is to be added to the application under development to interact with a data source.

Block 504 represents providing a cache in a computer-readable medium accessible by the application under development at runtime, with the cache comprising a data structure configured to correlate result data to the data source. For example, a main cache may be maintained by a development application to store data from multiple different sources as a database. Providing a cache accessible by the application under development at runtime may further comprise embedding a copy of cached result data in the application under development from the main cache. This may occur, for example, as part of block 510 referenced below or earlier in the process. However, the application under development may be configured to access the main cache directly, and so an embedded copy may not be used in all embodiments.

Block 506 represents receiving input indicating whether the data source is to be accessed by the application under development and setting a status flag in a computer-readable medium accessible by the application under development at runtime based on the input. For example, the development application may provide a menu, panel, or other graphical user interface whereby a user can set particular data sources to "online" or "offline" status. "Online" status can correspond to a flag that is interpreted by an application under development to permit access by the application under development to the actual data source. On the other hand, "offline" status can correspond to a flag that is interpreted by the application under development as requiring the use of cached data.

Block 508 represents inserting a cache reference code element into the application under development, with the cache reference code element configured to cause the application under development to selectively access one of the data source or the cache based on the status flag(s) when executed at runtime. For example, the cache reference code element can access a memory location or application service to obtain a flag indicating whether a particular data source is to be considered "online" or "offline."

The cache reference code element can be configured to redirect the component(s) of the application under development that are responsible for interfacing with the data source to instead interface with the cache (or access an embedded copy of cache data) when the flag(s) indicate that the source in question is offline. For example, in some embodiments, the cache reference code element that is inserted comprises a service proxy redirect class that conditionally links a web service or other service to the cache data location/provider.

Block 510 represents providing the application under development for execution. For example, if the application is developed using source code, then the source code can be compiled into one or more executable files and/or provided as a package of files as appropriate. As noted above, in some embodiments, a copy of cached result data can be embedded in the code or other data comprising the application under development. For example, if the application under development is to be executed as a SWF file (such as for the ADOBE® FLASH® or AIR™ execution environment), a copy of the cached result data can be included as one or more embedded XML files.

In any event, this version of the application under development selectively accesses cached data based on flags set using the application development tool. Thus, development and testing can continue without the need to have access to the online source(s) referenced in the application.

After testing and other development activities are complete, a user may desire to provide a "release" version of the application under development. In this example, the "release" version refers to an executable version of the application under development that does not include references to cached data. Accordingly, block 512 represents removing the cache reference element(s) from the application under development and block 514 represents providing a release version. For example, code segments corresponding to the cache reference element(s) can be recognized by tags, other identifiers, and/or syntax and then deleted from the code. If a copy of cached result data is included in the application under development, the cached result data can also be deleted; otherwise, the copy of cached data is simply not included in a "release" version.

Figure 6:
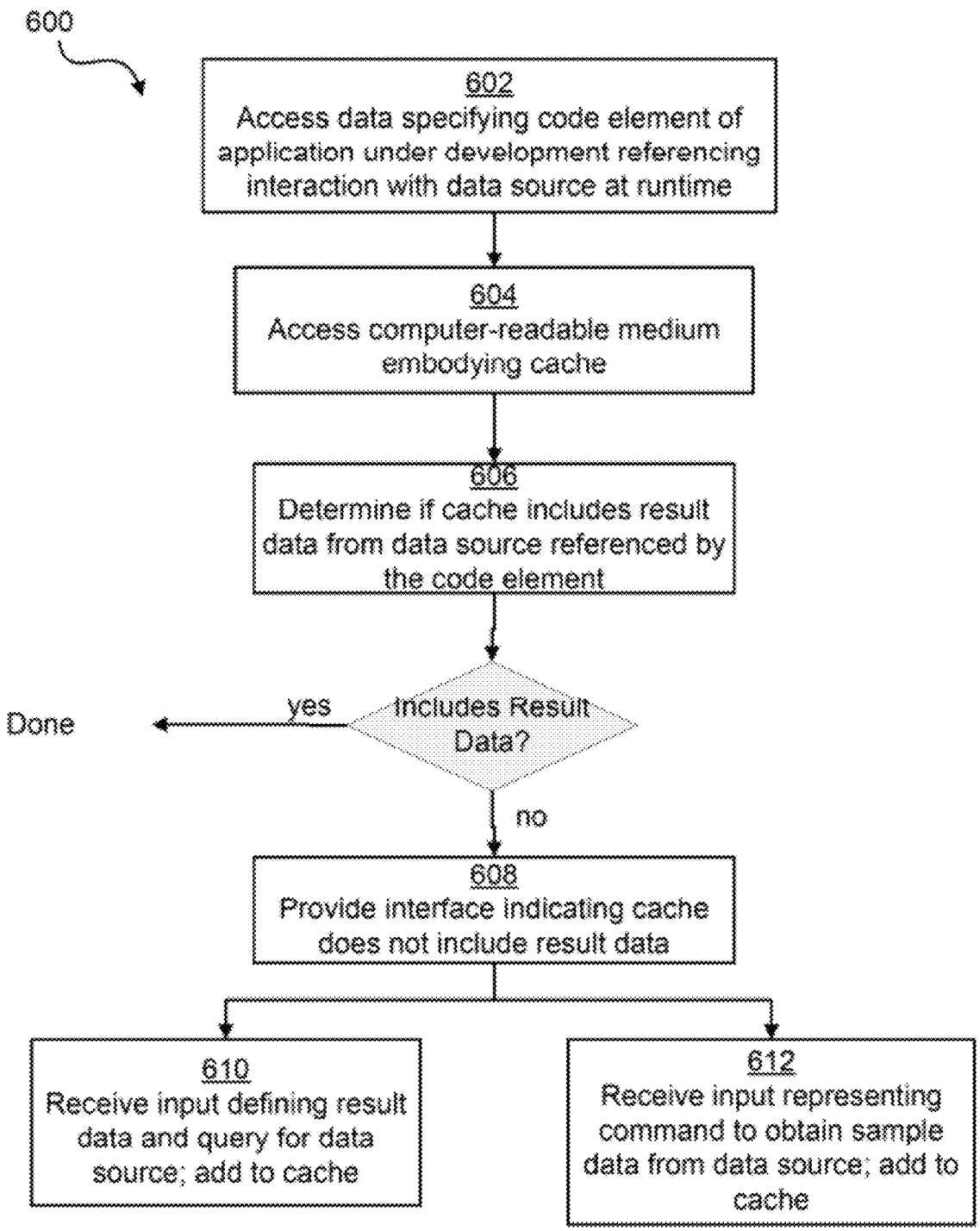
FIG. 6 is a flowchart showing an exemplary method for verifying cache contents.

FIG. 6 provides an example of a method 600 for evaluating a cache. In this example, block 602 represents accessing data specifying a code element of the application under development that references interaction with a data source by the application under development at runtime. As was noted above, this data may comprise input defining a code element or may comprise the result of searching or otherwise evaluating code to identify the element(s) of the code that reference interaction with a data source such as by looking for particular tags or code syntax that refers to a query or other interaction with a data source.

Block 604 represents accessing a computer-readable medium embodying a cache, the cache correlating result data to one or more data sources. For example, a database may comprise queries and results from one or more data sources. Block 606 represents determining if the cache includes result data from the data source referenced by the code element in the computer application under development.

For example, the code element in the computer application under development may reference a particular source and include a query with one or more parameters. The database comprising the cache can be checked to determine if one or more entries for the source are in the database and if the entries include the parameters.

In this example, method 600 is performed to determine and indicate whether the cache includes sufficient data to support offline access by the application under development. Block 608 represents providing an interface indicating the cache does not include result data from the data source. For example, the interface may comprise a dialog box or alert message that indicates which source(s) do not have corresponding data in the cache.

In some embodiments, the interface includes one or more input options for attempting to complete the cache. For example, block 610 represents receiving input defining result data and a corresponding query for the data source via the interface and adding result data to the cache based on the received input. The dialog may include, for example, text or other input boxes whereby a user can provide sample results for the query or queries for which the cache lacks result data.

As another example, the interface can comprise a freeform entry area where a user can define a row (or other logical unit) of cache data directly.

Block 612 represents receiving input via the interface and representing a command to obtain sample data from the data source. For example, in addition to or instead of providing data for the cache, the user may be presented with the option to obtain data for the cache directly from the data source(s) in question. This option may be presented in some embodiments only if a connection to the data source is available.

For instance, the application development tool may present the same series of dialogs or wizards used to sample data during other development operations such as data introspection. Namely, the user may be provided the option to define query parameters. However, the parameters may be pre-filled based on the code element(s) for which cache data is needed. Once the command to query the actual data source is provided, the development application can interface with the data source, such as by establishing an http or other connection and providing a query to the data source. After sample data is received, result data can be added to the cache, such as by appending records corresponding to the received data to the database.

Method 600 is illustrative of processes that can occur at various times and when the application under development is in various states. For example, in some embodiments, method 600 is triggered by a command indicating that one or more data sources are to be switched to "offline" mode in order to ensure that sufficient cached data is available. As another example, method 600 may be triggered when an application under development is to be provided with embedded cached data. Before embedding the cached data, the method may be invoked to ensure that sufficient cached data is embedded in the test version of the application under development.

Figure 7:
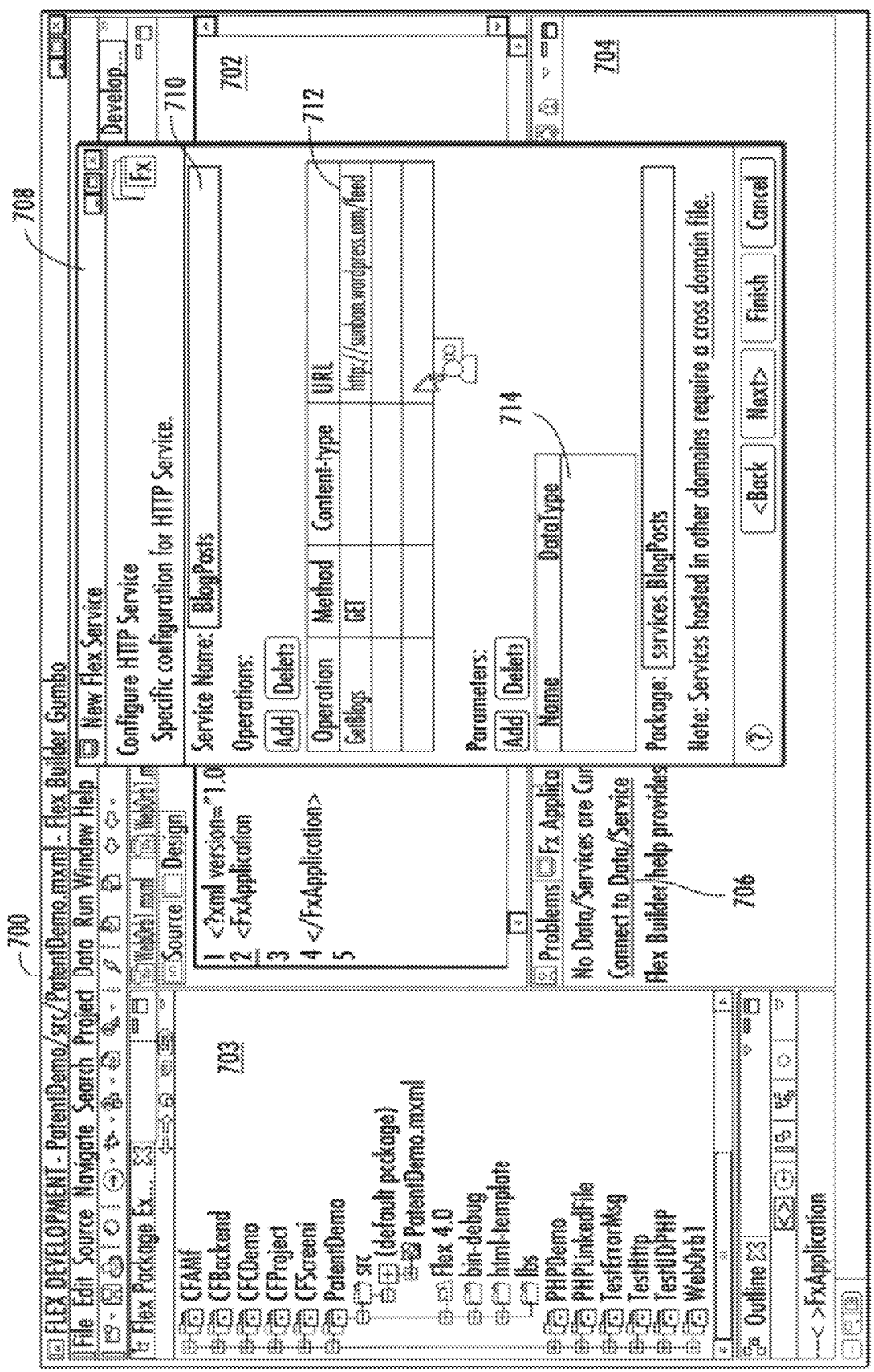

FIG. 7 is a diagram illustrating an exemplary interface 700 that may be provided by a development application in some embodiments. FIGS. 7 through 12 illustrate interfaces 700 of a development tool and an interface 1100 of a web browser that may be used by a developer to create, edit, and/or debug an application under development that references a data source at runtime. In this example, the development application accesses the data and the accessed data is used to characterize data from the source by defining logical units for referring to the data—specifically, data types for use in code elements will defined. The data sample obtained during the characterizing process is cached for later use. However, characterizing need not be supported in other embodiments that nonetheless support caching for debugging and other purposes.

In this example, interface 700 includes a code entry area 702 where a developer can provide input specifying one or more code elements. For example, the developer may type source code and/or provide menu selections to specify code elements to include. Although not shown, the interface may allow the developer to switch to a "design view" where user interface (UI) elements can be dragged into a work area, with corresponding code elements included in code entry area 702.

Interface 700 also includes package explorer 703. This may allow the developer to manage different components of a project and/or to move between multiple projects. Interface 700 also includes a work area 704 that includes a plurality of tabs. In this example, work area 704 includes a "Services" tab and an option "Connect to Data/Service" that allows the developer to specify a code element for the application under development that refers to a data source, such as a web or other service. In this example, clicking on the "Connect to Data/Service" option generates a dialog 708 to configure a new service.

Dialog 708 allows the user to configure an HTTP service to be referenced by the application under development at runtime. Other data formats may be accessed and HTTP is shown for purposes of example only. In this example, dialog 708 includes an entry area 710 where the developer can provide a name for the service ("Blogposts" in this example), while at 712 the developer can define one or more operations. In this example, an operation "GetBlogs" using a GET method has been defined with reference to the URL http://sunban.wordpress.com/feed which may, for example, reference blog postings. At 714, the developer can add one or more parameters to provide as part of an operation, although in the example no parameters are needed for the GET method. Examples of parameters that could be required by other queries include passwords, user IDs, or commands to select from multiple possible responses to the query. For example, a query to a data service may require a parameter selecting one of several databases that can be accessed via the data service.

Figure 8:
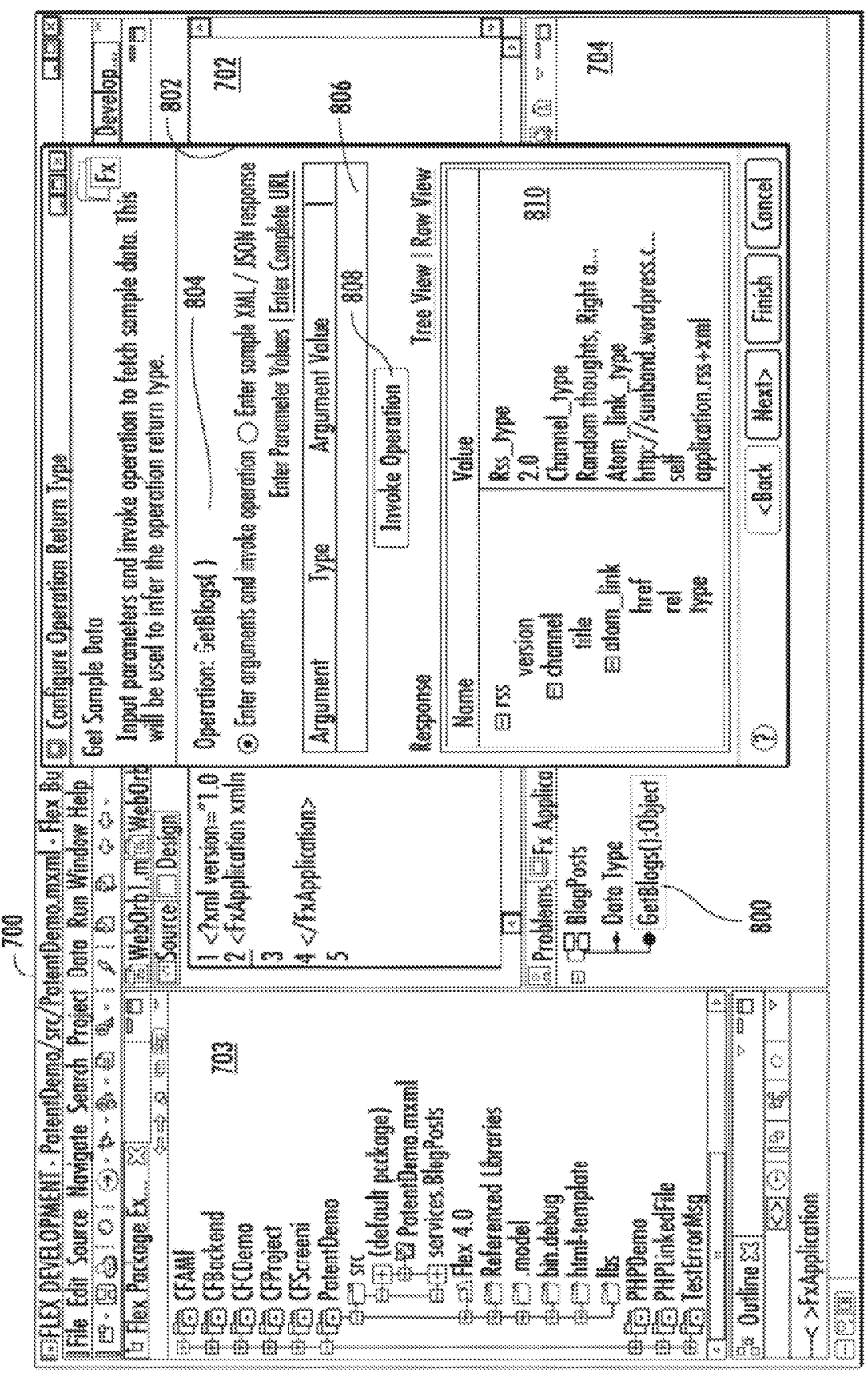

FIG. 8 illustrates interface 700 after the service "GetBlogs" has been defined. As shown at 800, the "Services" tab in work area 704 now includes an indicator of the "GetBlogs" service. Additionally, dialog 802 has been generated. At 804, the developer can select whether to invoke the operation on behalf of the development application or to enter a sample response. Area 806 allows the developer to include arguments and values that are to be included as part of the query sent to the service. Button 808 can be used to provide a command to access the data source using the query.

If the data source is accessed during development, the same query (or queries) that will be provided by the application under development at runtime can be provided by the development tool. Dialog 802 includes area 810 to indicate the returned data. In this example, the returned data includes several nodes, with each node representing an expandable portion of the structured data. This example includes an rss node with version information, a channel node including title, link data, description data, publication date, languages, and then an "items" node including a plurality of items that refer to specific blog postings (not visible in area 810).

The returned data can be stored in one or more computer-readable media, including working memory or mass storage (e.g. a disk drive) accessible by the development application to provide a cache of the returned data. For example, a database may be maintained that includes the returned data and the query (or queries) that resulted in the returned data, along with any parameters or operators provided as part of the query. The data/queries can be cross-referenced to the data source for later reference by the development application. As another example, the returned data may be inserted into one or more files associated with the application under development as noted above.

Figure 9:
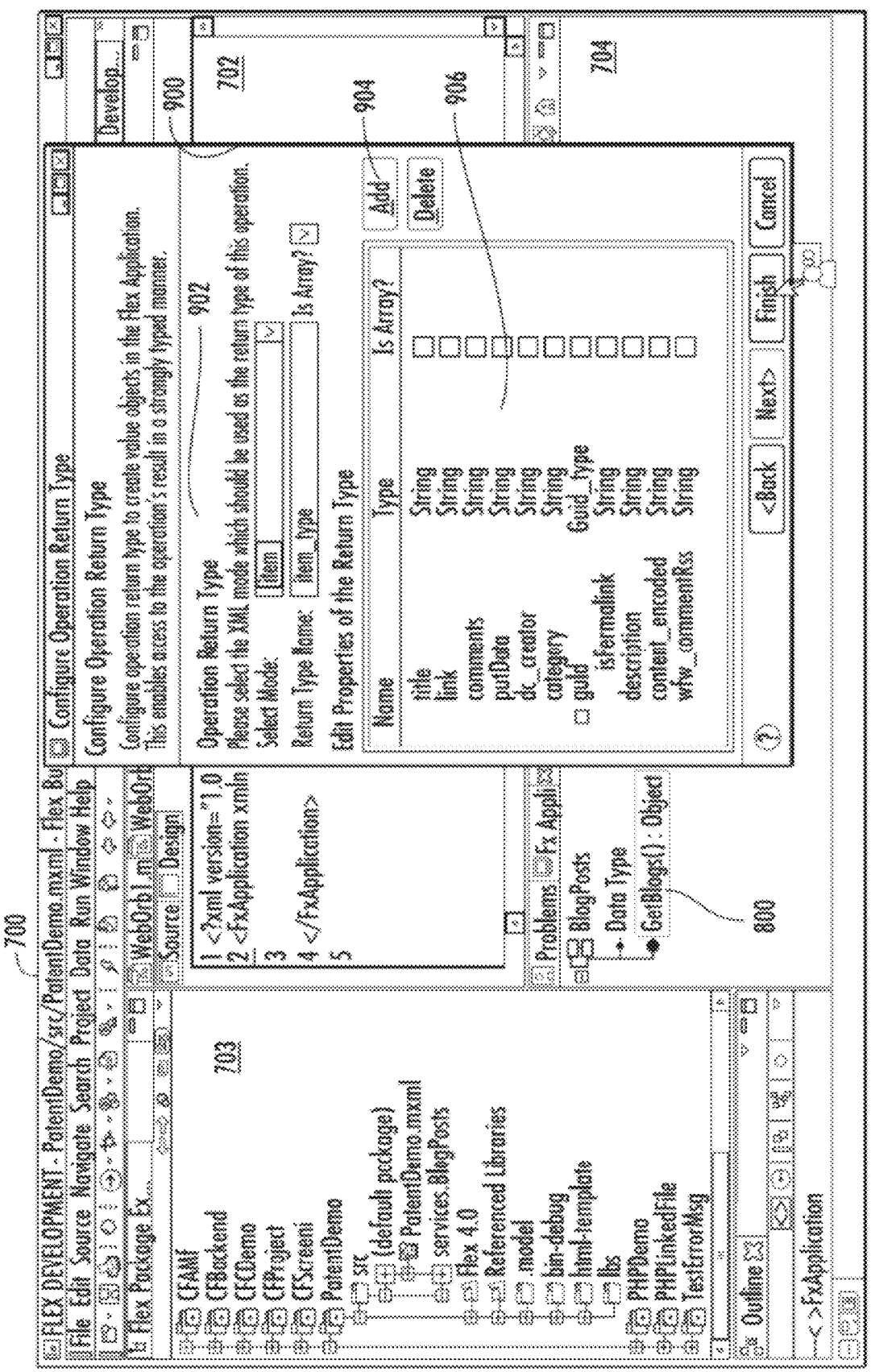

FIG. 9 illustrates another dialog 900 that can be provided in response to clicking the "next" button at the base of dialog 802. Dialog 900 allows the developer to select a node of the returned data to be used as the return type for the "GetBlogs" operation. In this example, the "Item" node has been selected and the returned data types are shown at 906. In this context, the application under development can refer to returned "title" data using the reference "GetBlogs.result.item.title", comments using the reference "GetBlogs.result.item.comments," and so on.

Figure 10:
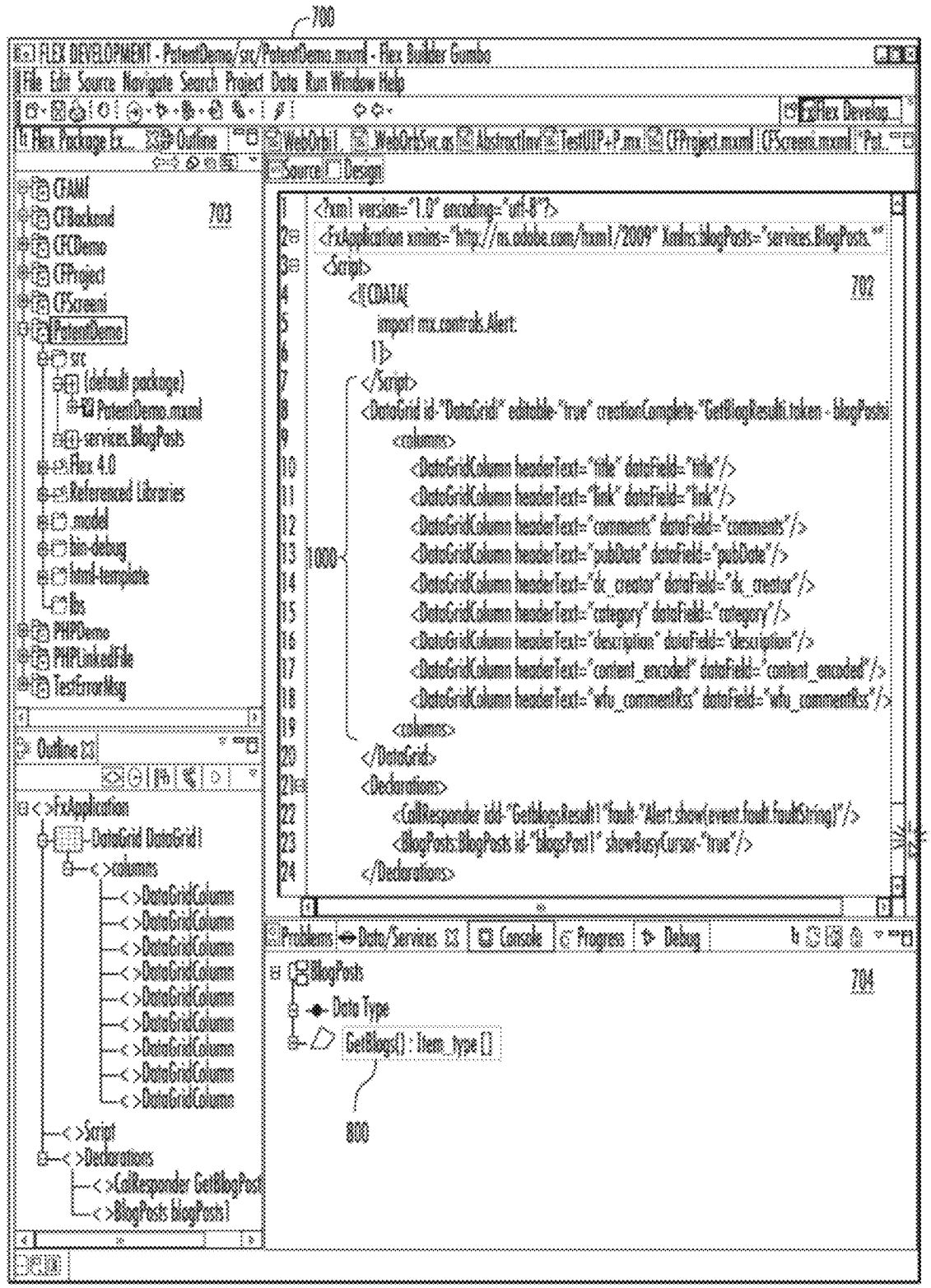

FIG. 10 illustrates interface 700 of the development application with a code element 1000 that refers to data returned from the data source. In this example, a data grid element has been specified using a data provider "GetBlogsResult1" that calls the GetBlogs method that was defined in the screens described above. In this example, different fields of the datagrid can be set to utilize data corresponding to the different types returned by GetBlogs.

Figure 11:
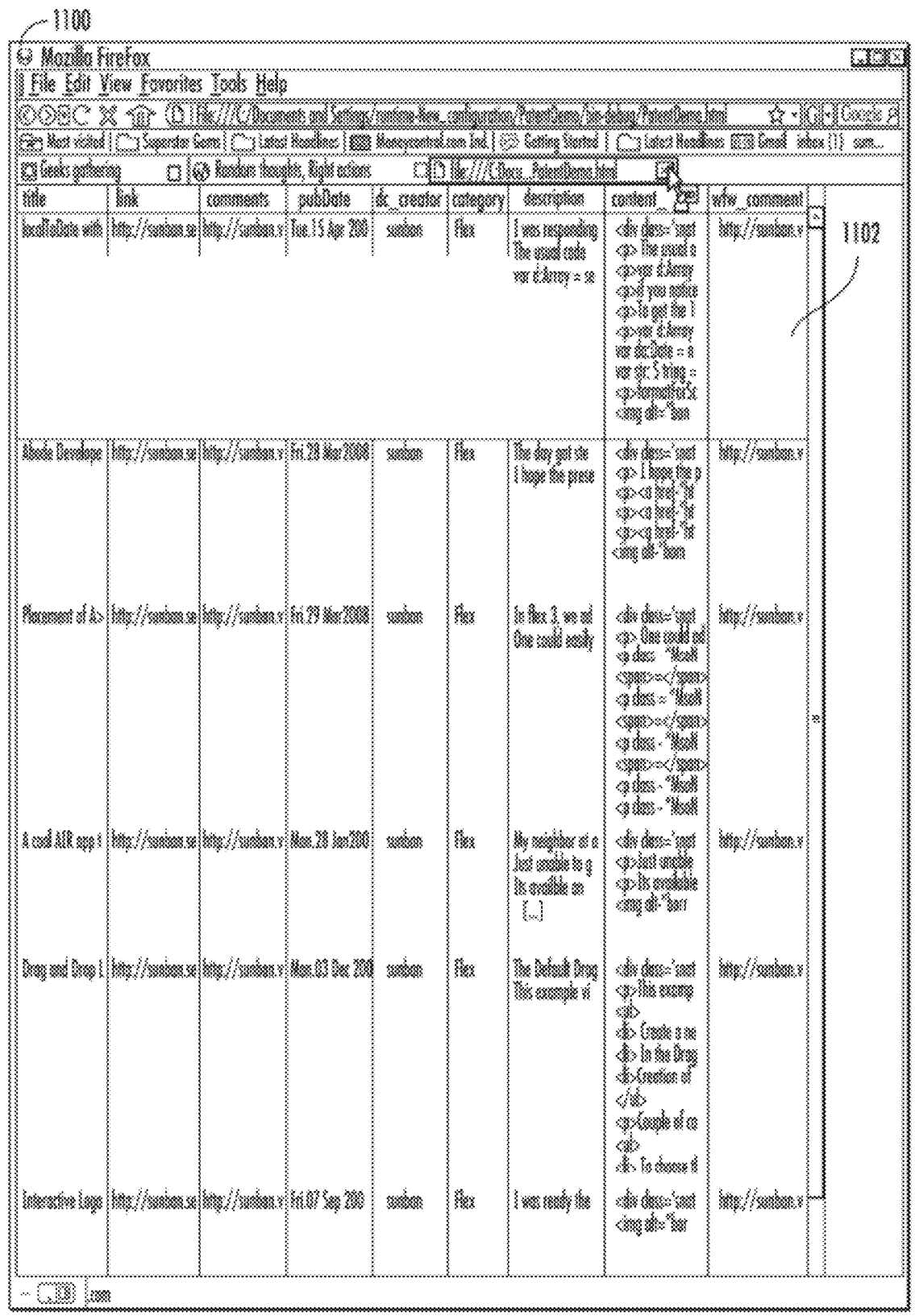

FIG. 11 shows an example of the application under development as executed at runtime. In this example, the application under development has been executed as a FLASH® application displayed via a plug-in for browser 1100. A data grid interface element 1102 has been generated by the application and displays different data for each item obtained via the GetBlogs service based on the data grid element specified in the source code.

During development, the application may be executed for debugging, testing, or other purposes. For instance, the data grid currently displays the data as text in a table without additional formatting. The intended result may be for more sophisticated output, such as formatting different columns differently, fetching linked content such as images, and otherwise adjusting the manner in which the data is displayed. To implement the desired result, the developer may edit the code via the development application and then re-compile and execute the application again; several edit, re-compile, and test iterations may occur.

Each time the application is executed, it may query the data provider referenced by GetBlogs( ). This may not be possible or desired in all circumstances. For example, the developer may be working at a location such as an airplane or remote area with no network connection. As another example, connecting to the data provider may be costly due to fees charged for accessing the data provider and/or network access fees. In such instances, the developer may wish to rely on cached data to avoid the need for repeated access to the data provider.

Figure 12:
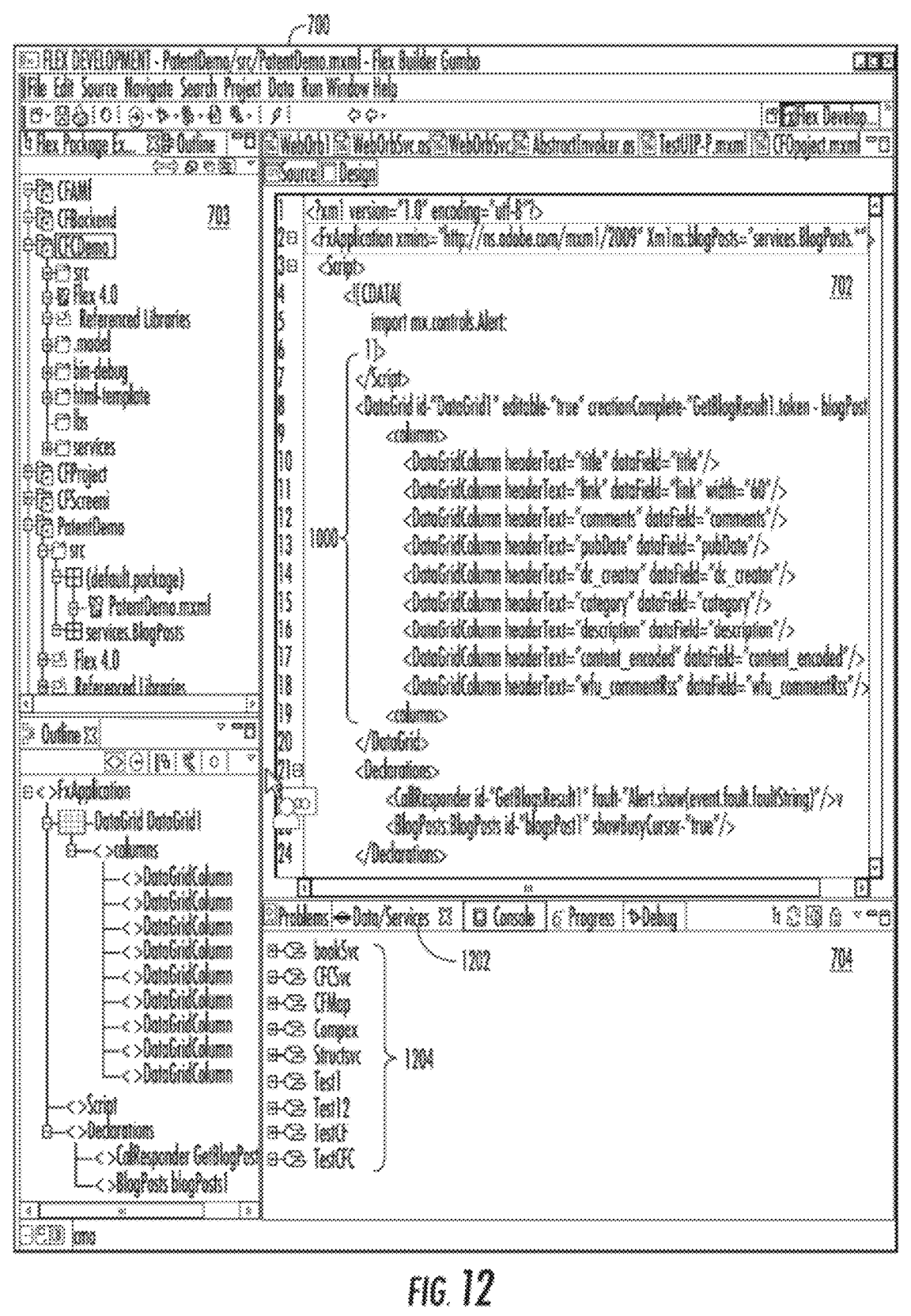

FIG. 12 illustrates interface 700, with a view of the "Data/Services" tab 1200 of work area 704. Several different data services are illustrated as a list 1204 and correspond to services referenced by different applications under development. Work area 704 (and/or a menu of interface 700) may allow the developer to switch between an "online" mode in which access to the services is provided and an "offline" mode in which cached data is used. The online/offline settings may be global or may be for specific data sources or providers.

As was noted above, in some implementations, the development tool may check to see if adequate data is in the cache prior to switching to offline mode. For example, the queries referenced in the code may be evaluated against stored queries to determine if the queries associated with the stored data match the queries referenced in the code. If not, interfaces such as dialog 708 may be presented to the developer to invoke the operation and receive data from the source and/or specify sample data for inclusion in the cache.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, but also application-specific integrated circuits and other programmable logic, and combinations thereof. Any suitable programming, scripting, or other type of language or combinations of languages may be used to implement the teachings contained herein in software.

Embodiments of the methods disclosed herein may be executed by one or more suitable computing systems. Such system(s) may comprise one or more computing devices adapted or configured to perform one or more embodiments of the methods disclosed herein. The order of the blocks presented in the examples above can be varied—for example, blocks can be re-ordered, combined, and/or broken into sub-blocks. Certain blocks or processes can be performed in parallel.

As noted above, such devices may access one or more computer-readable media that embody computer-readable instructions which, when executed by at least one computer, cause the at least one computer to implement one or more embodiments of the methods of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, personal digital assistants (PDAs), cellular telephones, and portable music players. Computing devices may be integrated into other devices, e.g. "smart" appliances, automobiles, kiosks, and the like.

The inherent flexibility of computer-based systems allows for a great variety of possible configurations, combinations, and divisions of tasks and functionality between and among components. For instance, processes discussed herein may be implemented using a single computing device or multiple computing devices working in combination. Databases and applications may be implemented on a single system or distributed across multiple systems. Distributed components may operate sequentially or in parallel.

When data is obtained or accessed as between a first and second computer system or components thereof, the actual data may travel between the systems directly or indirectly. For example, if a first computer accesses data from a second computer, the access may involve one or more intermediary computers, proxies, and the like. The actual data may move between the first and second computers, or the first computer may provide a pointer or metafile that the second computer uses to access the actual data from a computer other than the first computer, for instance. Data may be "pulled" via a request, or "pushed" without a request in various embodiments.

The technology referenced herein also makes reference to communicating data between components, including communication over a network. It should be appreciated that such network communications may occur over any suitable number or type of networks, including, but not limited to, a dial-in network, a local area network (LAN), wide area network (WAN), public switched telephone network (PSTN), the Internet, an intranet or any combination of hard-wired and/or wireless communication links.

Any suitable computer-readable medium or media may be used to implement or practice the presently-disclosed subject matter, including, but not limited to, diskettes, drives, magnetic-based storage media, optical storage media, including disks (including CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed is:

1. A computing system comprising a processor configured to access a computer-readable medium embodying program code comprising program components and to execute the program code, the program components comprising:
   a code manager configured to access data specifying elements for an application under development and store code in a computer-readable medium, the code providing the specified elements when executed at runtime;
   a data sampler configured to query a data source referenced by an element of the application under development and receive data in response to the query; and
   a data cache manager configured to:
      maintain a cache comprising parameters sent to the data source and data returned from the data source,
      provide a status flag based on receiving an indication of an online status or an offline status for the data source,
      responsive to a change in the status flag to the offline status, evaluating each of a plurality of references to the data source in the application under development, wherein evaluating each of the plurality of references comprises determining whether the cache includes, for each reference, respective parameters sent to the data source and respective data returned from the data source based on the respective parameters, and
      responsive to determining that the cache does not include, for at least one reference, respective parameters sent to the data source or respective data returned from the data source based on the respective parameters, preventing a change to the offline status for the data source.

2. The computing system set forth in claim 1, wherein the code manager is configured to insert a cache reference code element into the application under development, the cache reference code element inserted to redirect a query by the element of the application under development to the data source at runtime to data from the cache based on the status flag.

3. The computing system set forth in claim 1, further comprising a user interface module configured to provide an interface for selecting an online mode or an offline mode for each of a plurality of data sources.

4. A non-transitory computer-readable medium embodying program code, the program code comprising:
   program code for providing an interface to receive input specifying code elements of a computer application and to store code in a computer-readable medium;
   program code for identifying a plurality of code elements referencing access of a data source by the computer application when the computer application is executed at runtime;
   program code for interfacing with the data source, providing a query to the data source, and receiving result data from the data source in response to the query;
   program code for maintaining a cache comprising the result data;

program code for including a cache reference element in the computer application, the cache reference element linking the code element referencing access of the data source by the computer application to the result data based on an availability status flag for the data source;

program code for making the availability status flag available to the computer application at runtime;

program code for determining, responsive to a change in the availability status flag to an indication of an offline mode, whether the cache includes result data from the data source as referenced by each of the code elements in the computer application; and program code for, responsive to determining that the cache does not include the result data from the data source for at least one code element referencing the data source, preventing a change to the offline mode.

5. The computer-readable medium embodying program code as set forth in claim 4, further comprising program code for embedding cached result data in the computer application, wherein the cache reference element links the reference to the data source by the computer application to the embedded cached result data.

6. The computer-readable medium embodying program code as set forth in claim 4, further comprising program code for removing the cache reference element from the computer application based on a command to provide a release version of the computer application.

7. The computer-readable medium embodying program code as set forth in claim 4, further comprising program code for an offline mode selection interface, the offline mode selection interface including a plurality of options corresponding to respective data sources, wherein input to the offline mode selection interface is used to set the availability status flag for the data source.

8. The computer-readable medium embodying program code as set forth in claim 4, wherein including the cache reference element comprises inserting a service proxy class into the code for the computer application under development, the service proxy class redirecting a service method referencing the data source to the cache based on the availability status flag.

9. The computer-readable medium embodying program code as set forth in claim 4, further comprising:
program code for providing an additional interface and receiving input defining result data and a corresponding query for the data source; and
program code for including result data in the cache based on the received input.

10. The computer-readable medium embodying program code as set forth in claim 4, further comprising:
program code for accessing a query made by the computer application at runtime, the query comprising a parameter;
program code for determining if the cache includes result data for the query comprising the parameter;
program code for providing an additional interface and receiving input defining a result for the query;
program code for including result data in the cache based on the received input.

11. A computer-implemented method comprising:
accessing data specifying a plurality of code elements for an application under development, each of the code elements referencing a respective interaction with a data source by the application under development when the application under development is executed at runtime, wherein the application under development comprises one or more data structures embodied in a computer-readable medium;

providing a cache in a computer-readable medium accessible by the application under development at runtime, the cache comprising a data structure correlating result data to the data source;

receiving an indication of whether the data source is to be accessed by the application under development and providing a status flag in a computer-readable medium accessible by the application under development at runtime based on the indication; and inserting a cache reference code element into the application under development, the cache reference code element configured to:
cause the application under development to selectively access one of the data source or the cache based on the status flag when executed at runtime,
in response to the status flag changing from an online state indicating access to the data source to an offline state indicating access to the cache, determining whether the cache includes data returned in response to each interaction with the data source referenced by a respective code element;
in response to determining that the cache does not include data returned in response to at least one interaction with the data source, preventing a change to the offline state.

12. The computer-implemented method set forth in claim 11, further comprising embedding cached result data in the application under development, and wherein the cache reference code element links the reference to the data source by the application under development to the embedded cached result data.

13. The computer-implemented method set forth in claim 11, wherein including the cache reference code element comprises inserting a service proxy class into the code for the application under development, the service proxy class redirecting a service method referencing the data source to the cache based on the status flag.

14. The computer-implemented method set forth in claim 11, further comprising:
removing the cache reference code element from the application under development.

15. A computer-implemented method comprising:
accessing a computer-readable medium embodying program code for an application under development and identifying a plurality of code elements of the application under development, wherein each code element references a respective interaction with a data source by the application under development at runtime;

accessing a computer-readable medium embodying a cache, the cache correlating result data to one or more data sources;

determining, in response to an indication of a change to an offline status, whether the cache includes result data from the data source returned in response to each interaction with the data source by a respective code element referencing the data source; and responsive to determining that the cache does not include result data returned in response to at least one interaction with the data source by at least one code element with the data source, preventing the change to the offline status.

16. The computer-implemented method set forth in claim 15, further comprising:
receiving input defining result data and a corresponding query for the data source; and
adding result data to the cache based on the received input.

17. The computer-implemented method set forth in claim 15, further comprising:
- receiving input representing a command to obtain sample data from the data source;
- interfacing with the data source and providing a query to the data source;
- receiving sample data from the data source; and
- adding result data to the cache based on the received sample data.

18. A method comprising:
- executing instructions on a computing platform to access binary digital electronic signals representing a plurality of code elements of a computer application under development, each of the code elements referencing access of a data source by the computer application when the computer application is executed at runtime;
- executing instructions on the computing platform to interface with the data source, provide a query to the data source, and receive result data from the data source in response to the query;
- executing instructions on the computing platform to provide binary digital electronic signals representing a cache comprising the result data;
- executing instructions on the computing platform to include a cache reference element in the computer application, the cache reference element linking the code elements referencing access of the data source by the computer application to cached result data based on an availability status flag for the data source;
- executing instructions on the computing platform to make the availability status flag available to the computer application at runtime;
- executing instructions on the computing platform to determine, responsive to a change in the availability status flag to an indication of an offline mode, whether the cache includes result data from the data source as referenced by each code element in the computer application; and
- executing instructions on the computing platform to prevent a change to the offline mode in response to determining that the cache does not include the result data from the data source for at least one code element referencing the data source.

19. The computing system of claim 1, wherein the data cache manager is further configured to:
- determine access and response times associated with retrieving data from the data source in response to sending the parameters to the data source; and
- provide data from the cache at a data rate simulating the access and response times.

20. The computing system of claim 19, wherein the data cache manager is configured to provide data from the cache at a data rate simulating the access and response times by providing data at a data rate less than or equal to a stored access and response time.

\* \* \* \* \*